United States Patent [19]
Amdahl et al.
[11] 3,840,861
[45] Oct. 8, 1974

[54] DATA PROCESSING SYSTEM HAVING AN INSTRUCTION PIPELINE FOR CONCURRENTLY PROCESSING A PLURALITY OF INSTRUCTIONS

[75] Inventors: Gene M. Amdahl, Saratoga; Glenn D. Grant; Robert M. Maier, both of San Jose, all of Calif.

[73] Assignee: Amdahl Corporation, Sunnyvale, Calif.

[22] Filed: Oct. 30, 1972

[21] Appl. No.: 302,221

[52] U.S. Cl. .......... 340/172.5
[51] Int. Cl. .......... G06f 9/00, G11c 7/00
[58] Field of Search .......... 340/172.5

[56] References Cited

UNITED STATES PATENTS

| | | | |
|---|---|---|---|
| 3,234,519 | 2/1966 | Scholten | 340/172.5 |
| 3,397,391 | 10/1968 | Ottaway et al. | 340/172.5 |
| 3,544,973 | 12/1970 | Borck, Jr. et al. | 340/172.5 |
| 3,566,320 | 2/1971 | Stollman et al. | 340/172.5 |
| 3,609,700 | 9/1971 | Wollum et al. | 340/172.5 |
| 3,614,742 | 10/1971 | Watson | 340/172.5 |
| 3,623,008 | 11/1971 | Doblmaier et al. | 340/172.5 |
| 3,629,853 | 12/1971 | Newton | 340/172.5 |
| 3,662,348 | 5/1972 | Weiss | 340/172.5 |
| 3,665,411 | 5/1972 | O'Connor | 340/172.5 |
| 3,673,576 | 6/1972 | Donaldson | 340/172.5 |

*Primary Examiner*—Gareth D. Shaw
*Assistant Examiner*—Paul R. Woods
*Attorney, Agent, or Firm*—Flehr, Hohbach, Test, Albritton & Herbert

[57] ABSTRACT

Disclosed is a digital data processing system comprised of a main store, a storage control including a buffer store, a channel unit, an instruction unit, an execution unit and a console. The system is controlled by instructions which operate upon data to carry out desired data manipulations. Groups of instructions form a program where the program normally has its instructions sequentially executed, one at a time, to carry out a complete data manipulation. The instruction unit concurrently processes a plurality of instructions in an instruction pipeline which functions with a two-cycle, time-offset between instructions. That offset is an integral multiple of the cycle time of the functional units which execute instructions and is matched to instructions which use two storage accesses per execution where each access to storage requires one cycle.

19 Claims, 7 Drawing Figures

| | | | | | | | | | | | | | |
|---|---|---|---|---|---|---|---|---|---|---|---|---|---|
| I(1) | PFO | IA | IB1 | IB2 | D | R | OA | OB1 | OB2 | E1 | E2 | CK | W |
| I(2) | | | PFO | IA | IB1 | IB2 | D | R | OA | OB1 | OB2 | E1 | E2 |
| I(3) | | | | | PFO | IA | IB1 | IB2 | D | R | OA | OB1 | OB2 |
| I(4) | | | | | | | PFO | IA | IB1 | IB2 | D | R | OA |
| I(5) | | | | | | | | | PFO | IA | IB1 | IB2 | D |
| I(6) | | | | | | | | | | | PFO | IA | IB1 |
| | | | | | | | | | | | | | PFO |

DATA PROCESSING SYSTEM HAVING AN INSTRUCTION PIPELINE FOR CONCURRENTLY PROCESSING A PLURALITY OF INSTRUCTIONS

CROSS REFERENCE TO RELATED APPLICATIONS

1. DATA PROCESSING SYSTEM AND METHOD THEREFOR, Ser. No. 302,229, filed Oct. 30, 1972, invented by Gene M. Amdahl and Richard J. Tobias, assigned to Amdahl Corporation.

2. CONDITION CODE DETERMINATION AND DATA PROCESSING SYSTEM, Ser. No. 360,392, filed May 14, 1973, invented by Dee E. Larsen and Michael R. Clements, assigned to Amdahl Corporation.

3. RIGHT AND LEFT SHIFTER AND METHOD IN A DATA PROCESSING SYSTEM, Ser. No. 302,227, filed Oct. 30, 1972, now U.S. Pat. No. 3,790,960, invented by Michael R. Clements, Gene M. Amdahl and Lyle C. Topham, assigned to Amdahl Corporation.

4. DUAL OUTPUT ADDER AND METHOD OF ADDITION, Ser. No. 302,225, filed Oct. 30, 1972, invented by Ulrich Spannagel, assigned to Amdahl Corporation.

5. DIVIDE METHOD AND APPARATUS FOR A DATA PROCESSING SYSTEM, Ser. No. 302,223, filed Oct. 30, 1972, invented by Gene M. Amdahl and Michael R. Clements, assigned to Amdahl Corporation.

6. CODE CONVERTER AND METHOD FOR A DATA PROCESSING SYSTEM, Ser. No. 302,224, filed Oct. 30, 1972, now U.S. Pat. No. 3,803,392, invented by Gene M. Amdahl and Michael R. Clements, assigned to Amdahl Corporation.

7. CLOCK APPARATUS AND DATA PROCESSING SYSTEM, Ser. No. 302,222, filed Oct. 30, 1972, now U.S. Pat. No. 3,792,362, invented by Glenn D. Grant, assigned to Amdahl Corporation. 9. MULTIPLIER METHOD AND APPARATUS IN A DATA PROCESSING SYSTEM, Ser. No. 302,226, filed Oct. 30, 1972, invented by Gene M. Amdahl, Lyle C. Topham and Michael R. Clements, assigned to Amdahl Corporation.

10. CHANNEL DYNAMIC ADDRESS TRANSLATION, Ser. No. 312,733, filed Dec. 6, 1972, invented by Takesi Maruyama, Tatsuya Yoshikawa, Yoshiro Yoshioka and Richard L. Bishop, assigned to Amdahl Corporation.

11. BINARY CARRY LOOKAHEAD ADDER USING REDUNDANCY TERMS, Ser. No. 302,228, filed Oct. 30, 1972, now U.S. Pat. No. 3,805,045, invented by Dee E. Larsen, assinged to Amdahl Corporation.

BACKGROUND OF THE INVENTION

The present invention relates to the field of instruction-controlled digital computers and specifically to the system hierarchy and the structure of the instruction pipeline in a high-speed data processing system.

Instruction-controlled digital computers operate upon data to carry out desired data manipulations. A group of instructions form a program. The program normally has its instructions sequentially executed, one or more at a time, to carry out a complete data manipulation.

High-speed data processing systems generally include primary storage units, typically a slower speed, higher capacity main store and a higher speed, lower capacity buffer store, a channel apparatus for communicating with input/output devices, instruction handling apparatus, instruction execution apparatus, and a console for operator communication with the data processing system. Information is typically fed to and from the input/output devices to the remainder of the system through the buffer store which operates in cooperation with the main store as system storage. Instructions are fetched from storage by the instruction handling apparatus and are decoded to form control signals for controlling the operation of the execution and other apparatus in the system. The execution apparatus, for example, operates upon data from storage to carry out the data manipulation specified by the instruction. The results of the data manipulation are placed in storage and communicated to the input/output equipment via the channel or console.

In establishing a heirarchy for data processing systems, economy of cost and speed of performance are paramount considerations. The cost of the system is related to the number of circuits employed and the performance is related to the speed with which the system can execute groups of instructions and programs.

Data processing systems are made to operate faster by employing a plurality of units operating at the same time. In general, the more operations which can be simultaneously performed the greater the speed with which the data processing system can execute groups of instructions. In order to carry out operations simultaneously, redundant circuitry can be employed but such redundancy necessarily increases the cost of the system.

Increased performance of a data processing system can also be obtained by appropriately interfacing the system units to obtain a higher effective speed of operation with fewer circuits or with less expensive circuits and therefore, to obtain a lower cost system. For example, lower-speed, higher-capacity main stores are interfaced with lower-capacity, higher-speed buffer stores to obtain a higher storage access time than that available from the main store alone while obtaining a lower system cost than available using only high speed buffer technology.

Another factor to be considered in the design of a system hierarchy is the instruction processing sequences since the manner in which the groups of instructions are processed to control program execution has a significant relationship to system cost and performance.

While a number of instruction processing techniques are known in prior art systems there is a need for improvement in the cost/performance ratio for high-speed processing systems.

SUMMARY OF THE INVENTION

The present invention is a data processing system having storage apparatus, instruction handling apparatus and instruction execution apparatus. The instruction handling apparatus fetches and concurrently processes a plurality of instructions and controls the execution of the instructions by the system including supervising transfers of information between the system units. The execution apparatus performs data manipulations in a minimum time period and the instruction apparatus concurrently processes a plurality of instructions having a time off-set which is an integral multiple greater than one of that minimum time period.

In accordance with one aspect of the present invention, each instruction requires a minimum of thirteen time periods called segments for complete processing where each segment is one cycle of the system clock. The offset of each instruction is two segments whereby the instruction apparatus processes concurrently up to seven instructions.

In accordance with another aspect of the present invention, each instruction typically includes the thirteen segments PFO(prefetch offset), IA (instruction address formation), IB1(instruction buffer access initiation), IB2(instruction buffer access completion), D(instruction decoding), R(read address data), OA(operand address formation), OB1(operand buffer access initiation), OB2(operand buffer access completion), E1-(execution initiation), E2(execution completion), CK(check), W(write).

With a two segment offset between instructions, the instruction unit concurrently processes six instructions identified as I(1), I(2), . . .,I(6). Those six instructions, for example, have the following segments concurrently processed: W, E2, OB2, OA, D and IB1, respectively, and CK, E1, OB1, R, IB2 and IA, respectively. Also, at times, the PFO segment of a seventh instruction, I(7), is concurrently processed.

In accordance with the above summary, the present invention achieves the objective of providing a data processing system having an improved hierarchy with improved instruction sequencing.

Additional objects and features of the invention will appear from the following description in which the preferred embodiments of the invention have been set forth in detail in conjunction with the drawings.

DETAILED DESCRIPTION

Overall System

Figures 1, 2:
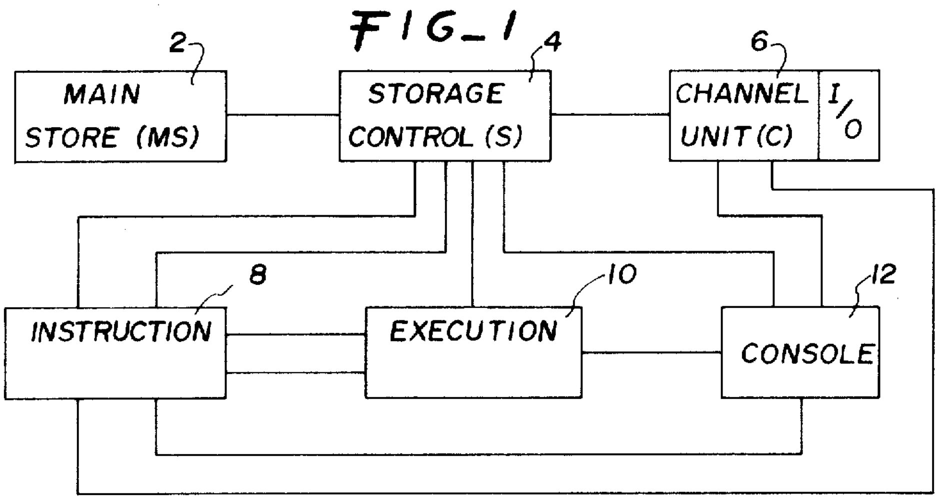
FIG. 1 depicts a block diagram of a data processing system which is organized to operate with the improved instruction sequencing of the present invention.
FIG. 2 depicts a schematic representation of instructions and their time offset relationship during concurrent processing in the pipeline of the instruction unit in the FIG. 1 system.

In FIG. 1, the data processing system of the present invention is shown to include a main store 2, a storage control unit 4, an instruction unit 8, an execution unit 10, a channel unit 6 with associated I/O and a console 12. The system of FIG. 1 operates under control of instructions where an organized group of instructions form a program. Instructions and the data upon which the instructions operate are introduced from the I/O equipment via the channel unit 6 through the storage control unit 4 into the main store 2. From the main store 2, instructions are fetched by the instruction unit 8 through the storage control 4 and are processed so as to control the execution within the execution unit 10. The system of FIG. 1 is, for convenience, compatible with the IBM System/360 and accordingly, general details as to the operation of data processing systems may be had by reference to the following publications: "IBM System/360 Principles of Operation," IBM Systems Reference Library, Form A22-6821. "Introduction to IBM System/360 Architecture" IBM System Reference Library C20-1667. "A Programmer's Introduction to the IBM Systems/360 Architecture, Instructions, and Assembler Language," IBM Systems Reference Library C20-1646. "IBM System/360 Principles of Operation" IBM Systems Reference Library GA22-7000.

The above publications are hereby incorporated by reference into this specification for the purpose of teaching the general operation of data processing systems, for identifying nomenclature, and for defining the architectural requirements of the Systems/360 and 370.

By way of introduction, the information format in the above data processing systems organizes eight bits into a basic building block called a "byte." Each byte also typically includes a ninth bit for parity used in error detection. Although express mention of the ninth bit in each byte is not generally made throughout this specification, it is assumed that there is a parity bit associated with each byte and that the normal parity checking circuitry is included throughout the system in a well-known manner.

Two bytes are organized into a larger field defined as a half-word, and four bytes or two-half words are organized into a still larger field called a word. Two words form a double word. A word is four consecutive bytes. While these definitions are employed in the specification, it will be understood that words or bytes can equal any number of bits.

Various data formats may be employed in the environmental system so that instructions and operands may be of different length depending upon the particular operation which is to be carried out. The instruction formats include RR, RX, RS, SI, and SS. As a typical example, the RX instruction includes an 8-bit OP code, a 4-bit R1 code , a 4-bit X code, a 4-bit B2 code and a 12-bit D2 code. The OP code specifies one out of 256 instructions. The R2, X2 and B2 fields each identify one of 16 general registers. The D2 field contains a displacement number between 0 and $2^{12}-1$. As an example of the RX instruction, the AD instruction adds the contents of the register identified by the R1 field to the contents of the main storage location addressed by the sum of the number in the D2 field added to the contents of the register identified by the X2 field again added to the contents of the register identified by the B2 field. The result is placed in the register identified by the R1 field. The RX instructions require two accesses to storage for execution, one to fetch the instruction and one to fetch one of the two operands. RR instructions require one storage access while SS instructions require a minimum of three.

The definition of System/360 and System/370 instructions appears in the above-referenced publications. The apparatus and method for executing those instructions is described hereinafter.

Instruction Unit

Figure 3:
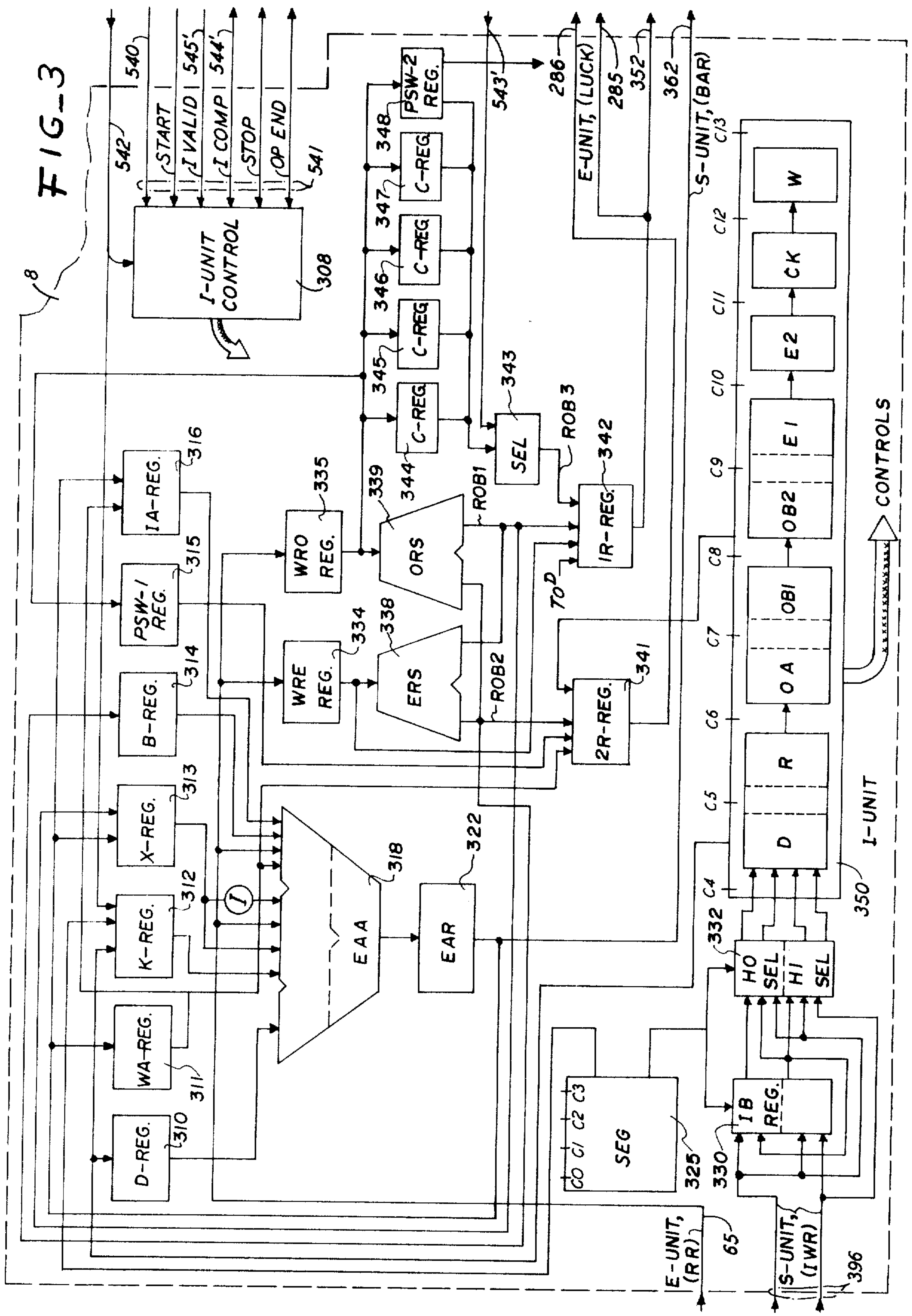
FIG. 3 depicts a schematic representation of the instruction unit of the FIG. 1 system.

In FIG. 3, the instruction(I) unit 8 of FIG. 1 is shown in detail. The I-unit 8 includes a plurality of addressing registers. The addressing registers include the 12-bit D register 310 for storing the displacement D1 or D2 obtained from the various instruction fields, the 24-bit WA register 312 for storing an address constant K, the 24-bit X register 313 for storing the register addressed by the X2 field of the instruction, the 24-bit B register 314 for storing the contents of the register identified by the B1 or B2 field, and a 24-bit IA register 316 for storing the instruction address. During the initial instruction fetching sequence, the IA register 316 stores bits 40 through 63 of the 64-bit PROGRAM STATUS WORD (PSW). Bits 32 through 39 of the PSW are stored in the PSW-1 register 315. Bits 0 through 31 of the PSW are stored in the PSW-2 register 348.

The addressing registers are connected with inputs to the effective address adder 318 which functions to add the contents of the selected addressing registers to form an effective address which is input to the effective address register (EAR)322. The effective address stored in the register 322, in addition to providing inputs back into the addressing registers, is connected as an input to the storage control unit 4 and specifically, to the buffer address register (BAR)363 via bus 362. From the register 363, the effective address addresses the high speed buffer (HBS)355 to access the desired instruction. The accessed instruction is one word in length and is stored in the IW register 388 from where it is gated into the instruction buffer IB register 330 or directly via the selection gates 332 into the instruction pipeline 350.

For use in generating the appropriate addresses and loading the addressing registers and for storing operands and other information the I-unit 8 includes an even register stack (ERS)338 and an odd register stack (ORS)339. Each of the stacks 338 and 339 includes four 32-bit scratch pad registers, and eight 32-bit general purpose registers for a total of eight scratch pad registers and 16 general purpose registers. Additionally, the even and odd stacks 338 and 339 each include four 32-bit registers which together define four 64-bit floating point registers. The outputs from each of the registers in the stacks 338 and 339 are connected via appropriate gates to readout bus ROB1 and to readout bus ROB2. Bus ROB1 is connected as an input to the 1R register 342 and bus ROB2 is connected as an input to the 2R register 341. The 1R register 342 and the 2R register 341 have their outputs connected via buses 285 and 286 to the execution unit 10 as inputs to the LUCK 20 and the 1R register also has its output connected to the storage control unit 4 via bus 352 as an input to the store data select gates 386. The buses ROB1 and ROB2 from the register stacks 338 and 339 also serve as inputs to the addressing registers. In order to gate information into the registers of the stacks 338 and 339, the result register RR in the execution unit 10 connects as an input to the write even WRE register 334 and the write odd WRO register 335, which connect as inputs to the even register stack 338 and the odd register stack 339, respectively. Additionally, the write odd register 335 has its output connected as an input to the control registers 344 through 348.

The output from the control registers 344 through 348 pass through selection gates 343 the output of which is the readout bus ROB3 which in turn is connected as an input to the 1R register 342. The register 344 through 348 provide a means whereby the control functions generally derived from the pipeline 350 insert their control conditions into the data stream of the data processing system.

The instruction fetch and the instruction presentation portions of the instruction sequence are segments PFO, IA, IB1 and IB2. The initial sequence processing is carried out under the control of the sequencer 325 in FIG. 3. The sequencer 325 controls the sequential instruction fetching and determines the next sequential instruction. After the prefetch offset (PFO), the sequential instruction fetching processing of sequencer 325 is in one of four states, the IA state, the IB1 state, the interlock state, or the wait state. The states are determined by logical determinations responsive to priority and other control signals in the data processing system.

Figure 5:
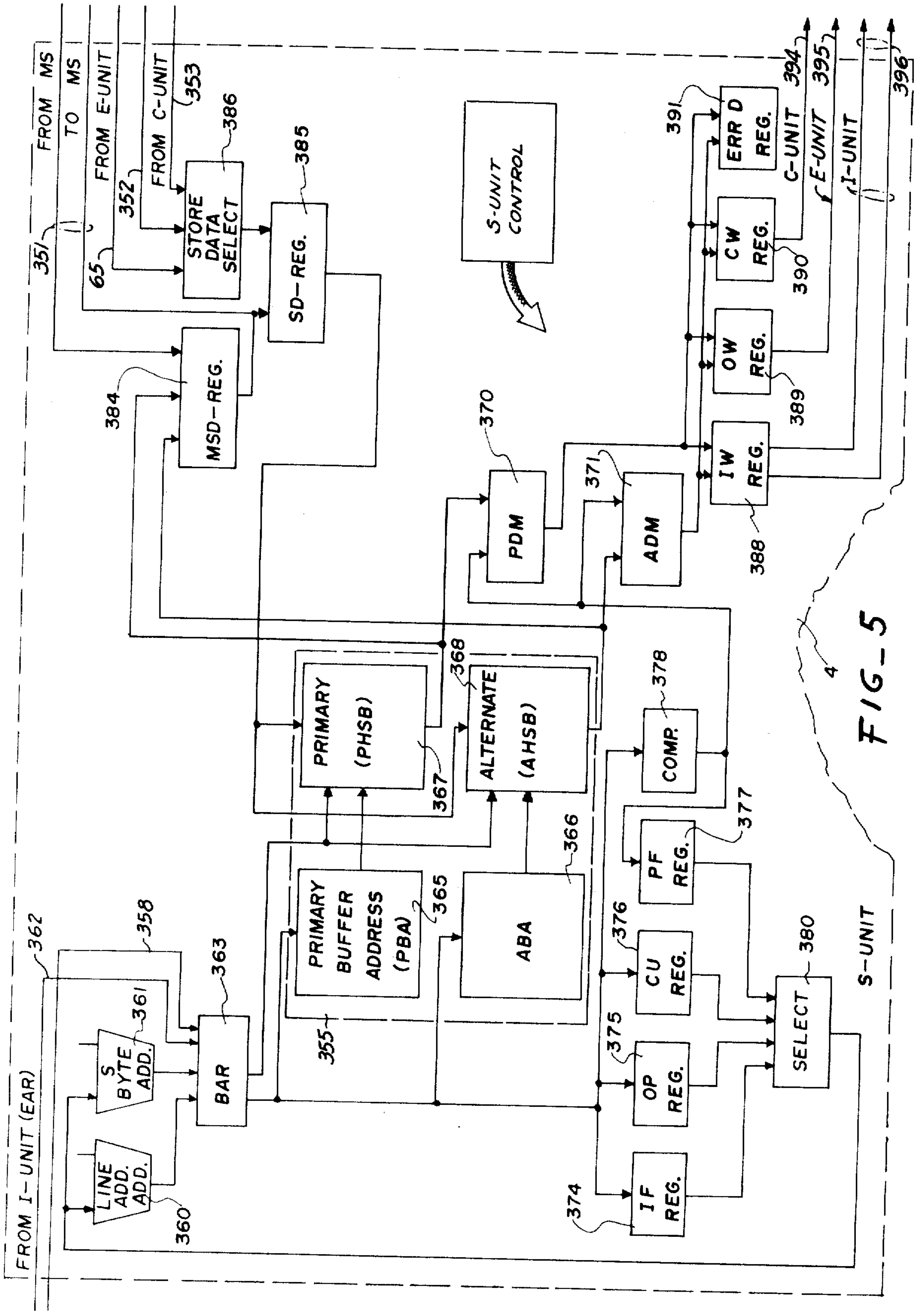
FIG. 5 depicts a schematic representation of the control unit of FIG. 1.

The next sequential instruction selection is carried out by the sequencer 325 to select whether the next instruction inserted into the pipeline 350 is obtained from the instruction word IW register 388, from the S-unit of FIG. 5, or whether the next instruction is derived from the instruction buffer IB register 330. The determination by sequencer 325 of which instruction is the next to be gated into the pipeline 350 is responsive to various control signals generated throughout the data processing system.

The target fetch (TF) determines which instruction is to be gated into the IW or IB registers as a candidate for the next instruction to be gated into the instruction pipeline 350. The target fetch is responsive to various control signals generated throughout the data processing system.

The logic circuitry for controlling the states in sequencer 325 are implemented using standard data processing techniques. For example, the sequencer is typically a serial counter which determines that instructions are fetched in a sequential counting order until the ordered sequence is interrupted, for example, by a branch instruction. Such tecnhiques are well known in the data processing field.

The initial segments PFO, IA, IB1, IB2 of the instruction sequence are processed under control of the sequencer 325 in FIG. 3. Sequencer 325 operates over the cycles C0, C1, C2 and C3. The prefetch offset segment PFO is carried out during time C0 to C1 which is one clock period and one cycle of the data processing system. During the PFO segment, a number to be added to the contents of the IA register 316 is loaded into the K register 312 and latched at time C1.

During the address formation, IA segment, the registers 310 through 316 are appropriately gated into the effective address adder EEA 318 which adds up to three inputs to form an effective address which is gated into the effective address register EAR 322 where that address is latched at time C2. During the instruction buffering segment IB1, the effective address from register 322 is gated via bus 362 to the buffer address register BAR 363 which is in the S-unit of FIG. 5. The register 363 is latched at time C3. The latching of data at time C3 is effective to address the high-speed buffer (HBS)355. During the buffering segment IB2 the addressed information is accessed from the buffer 355 and is latched in the instruction word IW register 388 at time C4.

At time C4, the data is introduced into the pipeline 350. Pipeline 350 includes the register and control stages 301, 302, 303, 304, 305 and 306. The stages 301, 302 and 303 each are active for two segments. Those stages each store pipeline information and generate control signals during two cycles of time C11. The information latched in the register of stage 304 is employed for the period from C11 to C12 to generate control signals to perform the check segment of the instruction sequence. At clock pulse C12, the stage 304 information segment becomes latched in the register of stage 305. Finally, information in the register of the stage 305 is used during the W segment, during the period from C12 to C13 to generate control signals for writing information. Thereafter, the information in the pipeline 350 is discarded and is no longer retained.

EXECUTION UNIT

Figure 4:
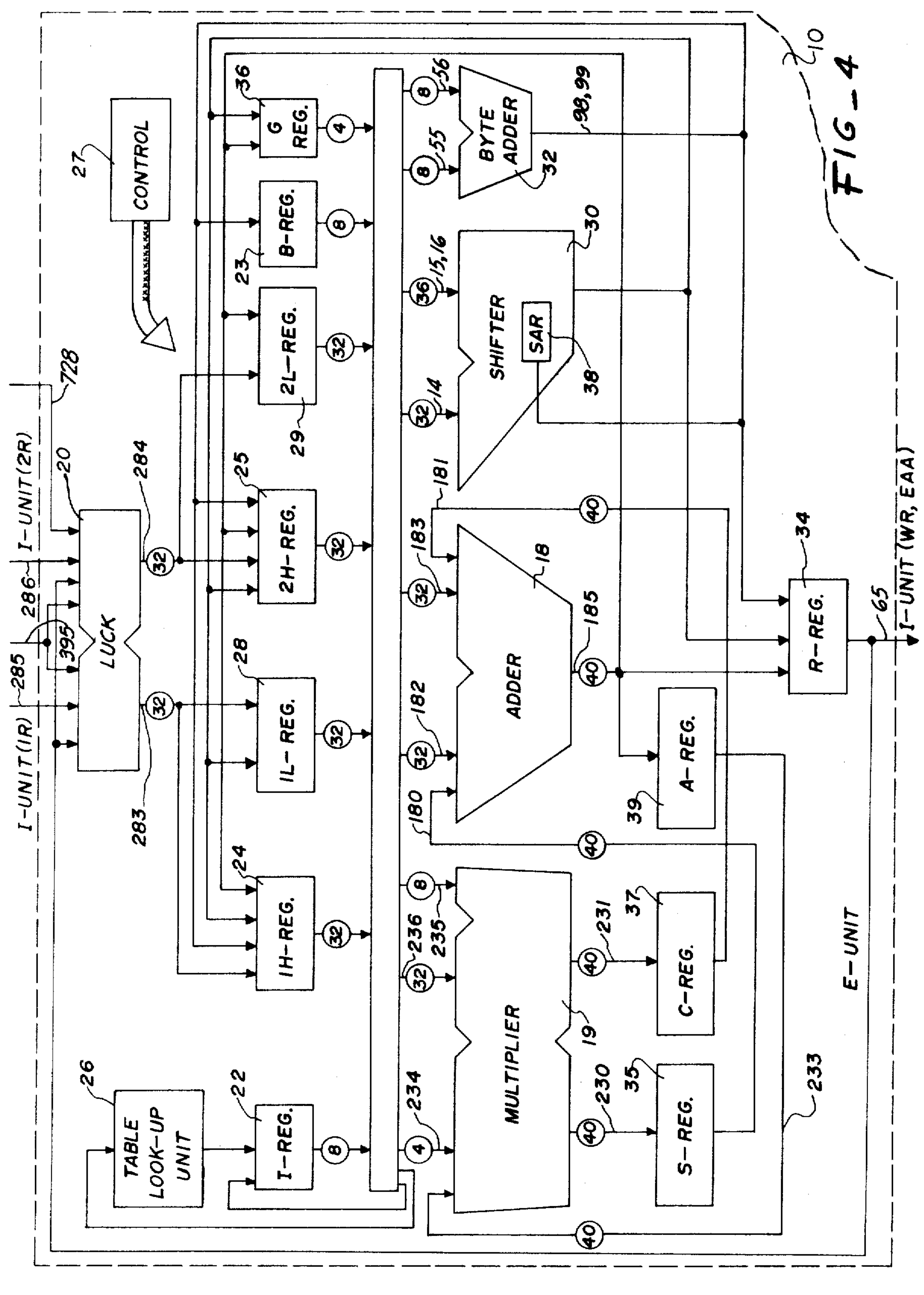
FIG. 4 depicts a schematic representation of the execution unit of FIG. 1.

In FIG. 4, the execution (E) unit 10 of FIG. 1 includes a logical checking apparatus identified as LUCK unit 20. The LUCK unit 20 receives input data on input buses 285 and 286 from the I-unit registers 1R and 2R shown of FIG. 3. The LUCk unit 20 performs logical functions, performs comparisons, counts the number of bits and compacts data from one format to another. The LUCK unit 20 provides the appropriate outputs on output buses 283 and 284 which serve as the inputs to the working registers of the data processing system. Further details of the LUCk unit 20 are described in the above-referenced application entitled CONDITION CODE DETERMINATION AND A DATA PROCESSING SYSTEM, Ser. No. 360,392, which is hereby incorporated by reference in the present specification.

The E-unit 10 also includes a plurality of registers, spcifically an 8-bit I register 22, a 32-bit 1H register 24, a 32-bit 1L register 28, a 32-bit 2H register 25, a 2L register 29, an 8-bit B register 23, a 4-bit G register 36, a 40-bit register 35, a 40-bit C register 37, a 40-bit A register 39 and a 32-bit R register 34.

Additionally, the execution unit 10 includes the table-look unit 26 connected as an input to the I register 22 used in connection with the divide algorithm used in the data processing system of FIG. 1.

The registers of the execution unit of the E-unit 10 are ingated and outgated from the five functional units of the data processing system. Those five functional units include the multiplier 19, the adder 18, the shifter 30, the byte adder 32 and the LUCk unit 20 as described above.

The multiplier 19 in E-unit 10 is a combination carry-save, carry-propagate adder which functions to receive an 8-bit multiplier byte Ai on input buses 235 and a 32-bit multiplicand B on input buses 236 and a 40-bit partial product C(i-1) on input bus 233. The multiplier 19 functions to perform the operation (Ai) (B)+C($i$−1)=R1($i$)R2($i$) where R1($i$) and R2($i$) are partial results which are stored in the S register 35 and the C register 37, respectively. Those partial results are then added in the carry-propagate adder 18 to form the partial product C($i$) stored in the A register 39. The A register 39 provides the partial product input on bus 233 to the multiplier 19 to continue the multiple iteration. Further details of the multiplier 19 are described in the above-referenced application entitled multiplier METHOD AND APPARATUS IN A DATA PROCESSING SYSTEM, Ser. No. 302,226, which is hereby incorporated by reference in the present specification.

The adder 18 in E-unit 10 receives 32-bit operands as inputs on buses 182 and 183 and 40-bit operands on inputs on buses 180 and 181 and forms a final sum output on line 185. That output from the adder 18 is latched into the A register 39, R register 34 or other of the working registers in the E-unit. Further details of the adder 18 are described in the above-referenced application BINARY CARRY LOOKAHEAD ADDER USING REDUNDANCY TERMS, U.S. Pat. No. 3,805,045, which is hereby incorporated by reference in the present specification.

The shifter 30 in E-unit 10 receives a 32-bit single word operand as an input either on input bus 14 or input bus 15 or a double word operand input on both buses 14 and 15 for performing left or right shifts to provide a shifted output on 32-bit output bus 63. Further details of the shifter 30 are described in the above-referenced application, RIGHT AND LEFT SHIFTER AND METHOD IN A DATA PROCESSING SYSTEM, U.S. Pat. No. 3,790,960, which is hereby incorporated by reference in the present specification.

The byte adder 32 in E-unit 10 receives input operand bytes A and B on the 8-bit input buses 55 and 56, respectively, and functions to form the dual algebraic additions A-B and B-A on output buses 98 and 99. Additionally, the byte adder 32 is employed in a conventional manner to perform 8-bit single additions A+B. Further details of the byte adder 32 are described in the above-reference application, DUAL OUTPUT ADDER AND METHOD OF ADDITION, Ser. No. 302,225, which is hereby incorporated by reference in the present specification.

The final results obtained by processing data through any of the functional units within the E-unit 10 of FIG. 4 are stored in the R register 34 from where that result is gated via bus 65 to other parts of the data processing system, for example, to the effective address adder 318 in the I-unit 8 of FIG. 3 and the odd and even write registers 334 and 335.

The control of the functional units and the registers in E-unit 10 is by conventional techniques and apparatus which is generally represented by the E-unit control 27 in FIG. 4. The clocking method and apparatus of the system of FIG. 1 is distributed by the E-unit control 27 in a manner described in the application entitled CLOCK APPARATUS AND DATA PROCESSING SYSTEM, U.S. Pat. No. 3,792,362, which is hereby incorporated by reference in the present specification.

STORAGE CONTROL UNIT

The storage (S) control unit 4 in FIG. 5 includes a buffer 355 for storing information which can be accessed at comparatively high speed. The buffer is addressed by the address in the buffer address register (BAR)363 which is loaded by input bus 362 from the effective address register (EAR)322 in the I-unit of FIG. 3. The information locations accessed in buffer 355 result in the fetching or storing of the corresponding information from or to main store (MS), the E-unit, the C-unit, or the I-unit. Communication to main store is via buses 351 which are connected as the inputs and outputs of the main store data (MSD) register 384. Each of the buses 351 is eight bytes (64 bits) wide as is the register 384. Register 384 also has inputs of four bytes from the primary high-speed buffer (PHB)367 and the alternate high-speed buffer (AHSB)368. The register 384 has a four byte output which is connected to the storage data (SD) register 385 which in turn has a four byte output connected as an input to the buffer stores 367 and 368. The communication from main store 2 of FIG. 1 to the storage control unit 4 is on an eight byte basis while communication between the storage control unit 4 and the E-unit 10 of FIG. 1 is on a four byte basis. The E-unit to S-unit communication is carried out over the input bus 352 from the E-unit which is connected to the storage data select gates 386 for storage in the four byte SD register 385.

Communication between the S-unit 4 and the E-unit 10 of FIG. 1 is via the input buses 352 through the store data select gates 386 for storing data in the storage data (SD) register 385 in the S-unit 4. Data output to the E-unit 10 is via the bus 395 which is also four bytes wide. Communication between the C-unit 6 and the S-unit 4 in FIG. 1 is via the input bus 353 to the select gates 386 and the output bus 394 both of which are also four bytes wide. Communication between the S-unit 4 and the I-unit 8 of FIG. 1 is via the input addressing bus 362 and the output bus 396, each of which is four bytes wide.

From the above description it is apparent that the S-unit 4 communicates with main store on the basis of eight byte data transfers while communication with the rest of the data processing system including the I-unit 8, the E-unit 10 and the C-unit 6 is on the basis of four-byte data transfers.

The buffer 355 is addressed by the buffer address register (BAR)363. The register 363 is loaded with an input from the bus 362 connecting to the effective address register (EAR) in the I-unit of FIG. 3. Additionally, the register 363 is loaded as an output from the S-unit byte adder 361 or from the S-unit line addition adder 360. With the buffer address in register 363, the address is simultaneously gated to the primary buffer address (PBA) unit 365 or the alternate buffer address unit (ABA)366. The address units 365 and 366 function to decode the higher order bits and select two unique storage locations, one in the primary high-speed buffer (PHSB) and one in the alternate high speed buffer (AHSB)367 and 368, respectively. The low order bits from the register 363 are gated directly to the buffers 367 and 368. The accessed words from each of the buffers 367 and 368 are gated to the primary data manipulator 370 and the alternate data manipulator 371, respectively. By comparison in the manipulators 370 and 371 with the comparator register 378, either the data from the primary buffer 367 in the manipulator 370 or the data from the alternate buffer 368 in the alternate manipulator 371 is selected. Data manipulators 370 and 371 also function to shift the data to insure proper alignment and otherwise manipulate accessed data for communication to other units within the data processing system. The selected one of the manipulators 370 or 371 gates the accessed information from the buffer 355 to an appropriate one of the registers 388 through 391. When an instruction word is to be gated to the I-unit, it is stored in IW register 388. When an operand word is to be communicated to the E-unit, it is stored in the OW register 389. When a channel word is to be communicated to the channel unit it is stored in the CW register 390. Register 391 is used in connection with error detection information and stores the output from buffer 355. Register 391 is used in combination with error correction circuitry (not shown) for correcting errors in information accessed from buffer 355.

The registers 374 through 378 are used in conjunction with the addressing and address updating of the buffer store. Register 374 is used in connection with the instruction fetch (IF), register 375 is used in conjunction with an operand (OP) fetch. Register 376 is used in conjunction with a channel (CU) fetch. Register 377 is used in conjunction with a prefetch (PF) for identifying the next to be required access of the buffer 355. The comparison register (COMP.) 378 is used in conjunction with the prefetch address stored in the register 377 and in the comparison carried in the data manipulator 371.

The output from the registers 374 through 377 is selected by the selection gates 380 for gating into the line address adder 360 which functions to increment the previous address to the next required address or the S byte adder 361 which functions to increment the byte portion of the address. The input from the adders 360 and 361 in combination with the inputs from the I-unit effective address register all function together to form the full address in the buffer address register 363.

Further details concerning the operation of the storage control unit within the data processing system of FIG. 1 are described in the above-referenced application, DATA PROCESSING SYSTEM AND METHOD THEREFOR, Ser. No. 302,229, filed Oct. 30, 1972, the details of which are hereby incorporated by reference in this specification.

CHANNEL UNIT

Figure 6:
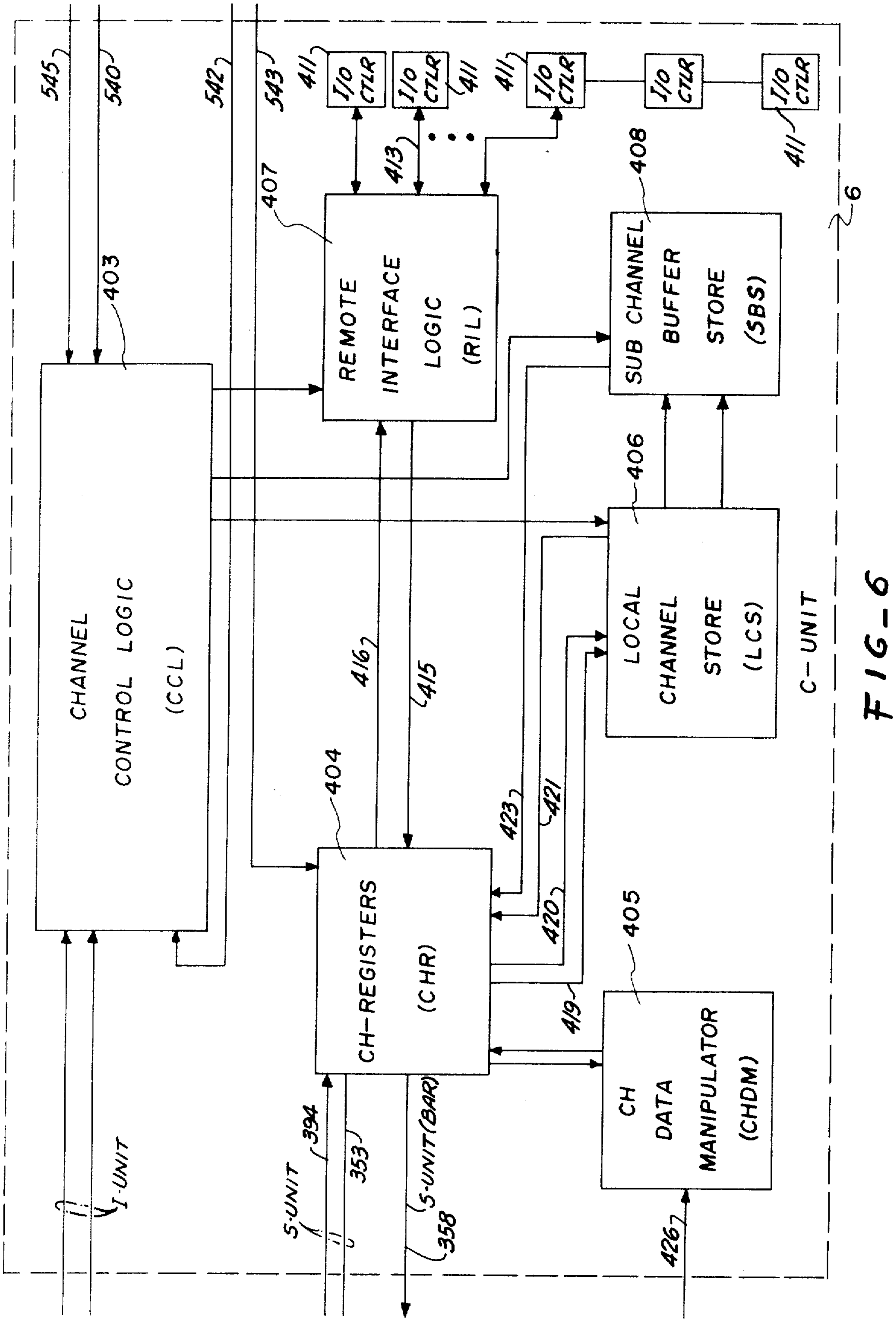
FIG. 6 depicts a schematic representation of the channel unit of FIG. 1.

The channel (C) unit 6 in FIG. 6 includes the channel registers 404 which communicate with the S-unit via the data buses 353 and 394 and via the address bus 358. Data from or to the S-unit is stored in channel registers 404. The channel registers communicate data to the I/O controllers (CTLR)311 through the remote interface logic (RIL)407. The data in the registers 404 is manipulated in the channel data manipulator (CHDM)405, is stored in the local channel store (LCS)406, and the subchannel buffer store (SBS)408. The addresses in which the data from the registers 404 is to be stored in the HBS buffer 355 of the S-unit is communicated over bus 358. The address of the I/O units is communicated from the I-unit to the channel control logic (CCL)403. The logic 403 has inputs to all of the units 404 through 408 of the C-unit 6. The controllers 311 are connected to the particular I/O apparatus (not shown) in a conventional manner from which data is input and output to and from the data processing system. Examples of I/O equipment are magnetic tape drives, CRT terminals, magnetic disc drive systems. Further details relating to the channel unit appear in the above-referenced application entitled, CHANNEL DYNAMIC ADDRESS TRANSLATION, Ser. No. 312,733, which details are hereby incorporated by reference in the present specification.

CONSOLE

Figure 7:
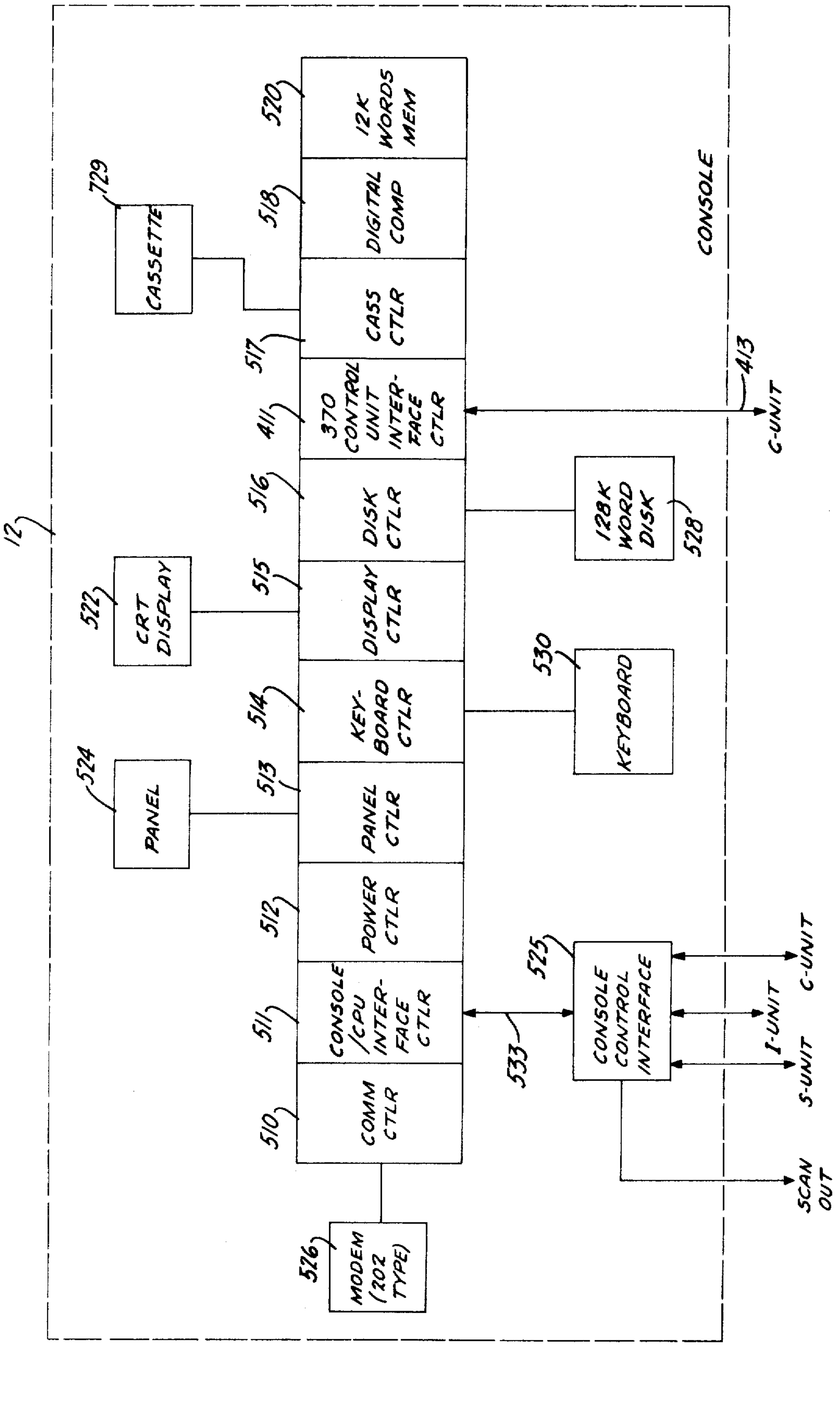
FIG. 7 depicts a schematic representation of the console unit of FIG. 1.

The console 12 in FIG. 7 includes a programmable digital computer 518 and associated memory 520 for controlling a plurality of controllers (CTLR)510 through 516 and a controller 411.

The controller 411 is one of the controllers 411 in the C-unit 6 of FIG. 6 and is connected to the remote interface logic 407 in FIG. 6 by the bus 413. Through controller 411 in FIG. 7, the console is connected to the data processing system of FIG. 1 as an I/O device.

Disc controller 516 is connected to computer 518 for interfacing with a 128K word disc storage 528. The controller 515 interfaces the computer 518 with the CRT display 522. The controller 154 interfaces computer 518 with the keyboard 530. The controller 513 interfaces computer 518 with the panel 524. The controller 512 interfaces the computer 518 with the power control apparatus. The controller 510 functions to interface the digital computer 518 with the MODEM 526 which is in turn connected to a telecommunication link such as a telephone line. The controller 511 interfaces the computer 518 with substantially all of the circuits in the S-unit, I-unit and E-unit of the data processing system of FIG. 1. Controller 511 connects via bus 533 to a console control interface 525. Further details of the controller 511, the console interface 525 and the manner in which the console 12 interfaces with the data processing system of FIG. 1 for enabling console 12 to execute instructions and commands in the FIG. 1 system.

The console 12 further enables data to be scanned out from the system of FIG. 1 independent of the data channels normally employed by the FIG. 1 system in executing instructions.

INSTRUCTION PROCESSING AND SYSTEM OPERATION

In accordance with the architectural requirements of a data processing system like that described in the above-referenced IBM/360 and /370 data processing system publications, the I-unit of FIG. 3 by means of the sequencing logic in sequencer 325 fetches the program status word (PSW) from a fixed location in storage. Typically, the program status word is stored in location O of main store so that the sequencer 325 on a start command loads all O's into the IA register 316. The all O address is communicated through the adder 318 without alteration to the effective address register 322. The effective address register, under control of sequencer 325 gates the address to the S-unit via bus 362 into the buffer address register 363 in FIG. 5.

In FIG. 5, the all O address in the buffer address register 363 accesses the program status word from the buffer store 355 latching the PSW into the IW register 388. From register 388 via buses 396, the PSW is gated through the E-unit 10 of FIG. 4 where it appears on output bus 365 in the WRO register 335 from which it is stored in PSW 1 register 315, the IA register 316, and the PSW2 register 348. The portion stored in IA register 316 passes through the adder 318, the effective address register 322 and is input to the register 316.

With the PSW properly fetched and loaded and with status triggers and other controls properly set in the I-unit control 308, in accordance with conventional techniques, the system is iniated and ready to commence execution of the program identified by the address of the first instruction within the PSW. For the initial instruction, the prefetch offset PFO is typically O and therefore the value added into the K register by the PFO is zero. Thereafter the PFO typically adds 4 to the value of the K register signifying an increase by four bytes, one word, over the previous value. The processing of the instructions commences by the sequencer 325 gating the address from the IA register 316 of the first instruction in the program through the adder 318, adding any required value from the K or other registers, to the effective address register 322. From effective address register 322, the address is gated to the S-unit 4, in the manner previously described for the fetching of the PSW, to access the desired instruction. The transfer of the instruction from the register 316 and the addition in adder 318 to obtain the effective address in register 322 is carried out during the IA segment of each instruction sequence. The transfer through the adder 318 from register 316 to register 322 is done under the control of a clock apparatus within the I-unit control 308. The clock apparatus and gating is carried out in accordance with the principles in the above-identified application, CLOCK APPARATUS AND DATA PROCESSING SYSTEM, U.S. Pat. No. 3,792,362. Specifically, the data is latched into the register 316 during the clock pulse C1 and is thereby propagated through the data path including the adder 318 and is latched in the register 322 by clock pulse C2, all previously described.

The IB1 segment of the instruction processing, between the clock pulses C2 and C3, transfers data from EAR register 322 to the EAR register 363 in the S-unit. The IB1 segment establishes the address in register 363 and commences the addressing of the buffer 355. Buffer 355 when thus addressed functions to access the required instruction from the buffers 367 or 368 through the data manipulators 360 and 371 to store the accessed information in the IW register 388 during clock pulse C4. The accessing of information from the buffer 355 is completed during segment IB2 of the instruction processing, between clock pulses C3 and C4. With the data latched into the register 388 by the clock pulse C4, the D segment of the instruction processing commences by decoding of the instruction in register 388 through buses 396 and selection gates 332 which are input to the instruction pipeline 350.

The D segment of the pipeline commences with clock pulse C4 at which time the instruction is decoded. For RX instructions control signals are generate to cause appropriate ones of the address registers to be loaded with information accessed from the register stacks 338 and 339. Those decoded control signals cause, in conjunction with the I-unit control 308, the appropriate registers in the stacks 338 and 339 to be selected enabling the reading of information during the R segment of the instruction sequence between clock pulses C5 and C6 to access data from the registers 338 and 339 and to latch that information in the selected ones the registers 310 through 316 at clock pulse C6.

With the operand address information stored in the appropriate addressing registers 310 through 316, the OA segment at clock pulse C6 generating control signals causing the operand address, of the operand to be fetched from storage, to be formed by the adder 318. Adder 318 adds the displacement from the D register 310 to the number in the X register 313 to the base number in the register 314. Those three numbers are input by clock pulse C6 to the adder 318 which forms the sum in the effective address register 322 where that sum is latched by clock pulse C7.

The clock pulse C7 initiates the OB1 segment of the instruction sequence which generates control signals that cause the effective address in the register 322 to be gated, via bus 362, to the S-unit BAR register 363 where it is latched by clock pulse C8.

Clock pulse time C8 initiates the OB2 segment in which the addressed operand is accessed from the buffer store 355 and stored in the OW registered 389 by clock pulse C9.

Clock pulse C9 initiates the ninth E1 segment during which the operand in register 389 is gated as an input to the LUCK unit 20 in the E-unit 10 of FIG. 4. Simultaneously therewith, a second operand from the registers 341 or 342 is also gated as an input to the LUCK unit 20 by clock pulse C9. The E1 segment is one cycle of execution operating upon two input operands to LUCK unit 20 to produce a result which is stored in the appropriate one of the working registers to the appropriate one of the working registers 23, 24, 25, 28, 29, or 36 by clock pulse C10.

Clock pulse C10 initiates the E2 segment during which control signals are generated by stage 304 to outgate operands from the working registers to the appropriate one of the remaining functional units comprising the adder 18, the multiplier 19, the shifter 30 and the byte adder 32. The result output from the selected one of the functional units is stored in one of the registers 34, 35, 37 or 39 clock pulse C11.

Clock pulse C11 initiates the CK segment during which control signals are generated to cause the data processing system to check the validity of the result obtained before writing that result into storage and potentially destroying source data which is not readily recoverable without loss of processing time. The check cycle is completed by clock pulse C12. The cycle from C11 to C12 also transfers the result from R register 34 to one of the registers 334 or 335 where that result is latched by clock pulse C12.

Clock pulse C12 initiates the W segment which causes stage 306 to generate control signals in the absence of an error being detected during the CK segment, to store the result from registers 334 or 335 into the register stacks 338 or 339.

While the invention has been described in connection with the pipeline processing of instructions without interruption, further examples of the pipeline instruction operation are described in the above-referenced application, CONDITION CODE DETERMINATION AND DATA PROCESSING SYSTEM, Ser. No. 360,392. That specification is hereby incorporated by reference in this specification for the purpose of further teaching the pipeline processing of instructions in accordance with the present invention.

While the invention has been particularly shown and described with reference to preferred embodiments thereof, it will be understood by those skilled in the art that the foregoing and other changes in form and details may be made therein without departing from the spirit and scope of the invention.

We claim:

1. A data processing system having storage apparatus, instruction handling apparatus and instruction execution apparatus wherein the system performs data manipulations under the control of instructions where each instruction is processed in segments where each segment has a duration equal to a number of clock cycles, the improvement comprising, clock means providing clock signals which define clock cycles for controlling the data processing system, instruction sequence processing means including at least three stages where said stages include at least three register means for storing instructions and where said stages include control means responsive to information in said register means for controlling said storage apparatus and said instruction execution apparatus, means for sequentially stepping a plurality of segmented instructions through said stages with a time-offset between instructions equal to an integral number, greater than unity and less than five, of clock cycles.

2. The data processing system of claim 1 wherein said time-offset is two clock cycles.

3. The data processing system of claim 1 wherein each instruction is processed in thirteen segments and where said segments are processed in one or more clock cycles.

4. The data processing system of claim 3 wherein said instruction segments are PFO, IA, IB1, IB2, D, R, OA, OB1, OB2, E1, E2, CK, and W and wherein said system includes means for prefetch offset formation operative during said PFO segment, means for instruction address formation operative during said IA segment, means for instruction buffer access initiation operative during said IB1 segment, means for instruction buffer access completion operative during said IB2 segment, means for instruction decoding operative during said D segment, means for reading address data operative during said R segment, means for operand address formation operative during said OA segment, means for operand buffer access initiation operative during said OB1 segment, means for operand buffer access completion operative during said OB2 segment, means for execution initiation operative during said E1 segment, means for execution completion operative during said E2 segment, means for checking operative during said CK segment, and means for writing operative during said W segment.

5. The data processing system of claim 2 wherein the execution apparatus includes a plurality of functional units for executing instructions, where said functional units are each operative to perform a data manipulation once per cycle and where at least two functional units are connected in series to operate over two cycles of said data processing system.

6. The data processing system of claim 2 wherein said instruction execution apparatus includes, a first functional unit responsive to said instruction sequence processing means for executing logical, comparison and checking functions over a first cycle of the data processing system, a second functional unit connected to receive the output from said first functional unit and responsive to said instruction sequence processing means for executing additions over a second cycle of the data processing system whereby the execution time for data manipulations in said first and second functional units equals two cycles and also equals the timeoffset of instructions in said instruction sequence processing means.

7. The data processing system of claim 6 wherein said execution apparatus further includes a multiplier functional unit, a shifter functional unit, and a byte adder functional unit each connected in parallel with said second functional unit and each operable over said second cycle and each connected in series to receive an output from said first functional unit whereby the execution time for data manipulations in said execution apparatus equals at least two cycles and equals the time-offset of instructions in said instruction processing means.

8. The data processing system of claim 1 wherein said instruction sequence processing means includes a plurality of address registers for storing address values to be added in forming effective addresses, an effective address adder connected to receive the information stored in said address registers, an effective address register for storing the output from said effective address adder, an instruction pipeline including a plurality of shift register stages for storing said instructions during sequential segments of the instruction sequence processing, sequential control means for causing the effective address in the effective address register to access instructions from said storage apparatus and transfer said instructions into said instruction pipeline.

9. The data processing system of claim 8 wherein the segments for each instruction include PFO for prefetch offset formation, IA for instruction address formation, IB1 for instruction buffer access initiation, IB2 for instruction buffer access completion, D for instruction decoding, R for reading address data, OA for operand address formation, OB1 for operand buffer access initiation, OB2 for operand buffer access completion, E1 for execution initiation, E2 for execution completion, CK for checking, W for writing and wherein said instruction sequence processing means includes, a first stage operative over said D and R segments of each instruction and having a first register for storing said instruction at the end of said R segment; a second stage responsive to said first register and operative over said OA and OB1 segments of each instruction and having a second register for storing said instruction at the end of said OB1 segment; a third stage responsive to said second register and operative over said OB2 and E1 segments of each instruction and having a third register for storing said instruction at the end of said E1 segment; a fourth stage responsive to said third register and operative over said E2 segment of each instruction and having a fourth register for storing said instruction at the end of said E2 segment; a fifth stage responsive to said fourth register and operative over said CK segment of each instruction and having a fifth register for storing said instruction at the end of said CK segment; and includes a sixth stage responsive to said fifth register and operative over said W segment of each instruction, control means for sequentially stepping said instructions through said instruction sequence processing means.

10. The data processing system of claim 9 wherein said instruction sequence processing means includes, means operative over said PFO segment of each instruction to store address information in said address registers, means operative over said IA segment of each instruction to gate effective address information to said adder from said addressing registers whereby said adder forms an effective address in said effective address register, means operative over said IB1 segment of each instruction to transfer the effective address from said effective address register to said storage apparatus to initiate accessing of an instruction, means operative over said IB2 segment of each instruction to complete accessing of the addressed instruction in said storage apparatus.

11. The data processing system of claim 10 wherein said storage apparatus is addressable and accessable within two cycles of said data processing system and includes a storage unit, a buffer address register for addressing said storage unit over said IB1 and said OB1 segments of each instruction, and a plurality of registers for fetching and storing data in data locations addressed by said buffer address register over said IB2 and said OB2 segments of each instruction.

12. The data processing system of claim 1 wherein said execution apparatus requires at least two clock cycles to perform data manipulations, wherein said storage apparatus accesses storage locations therein for fetching or storing data in at least two clock cycles of said data processing system, and wherein said means for sequentially stepping includes means for stepping said instructions with a time-offset equal to two clock cycles of said data processing system.

13. The data processing system of claim 12 wherein said system is operative, in response to said instruction sequence processing means, to process instructions requiring two accesses to said storage apparatus, one access for instruction fetching and one access for operand fetching, said accesses to said storage apparatus being carried out in response to said instruction sequence processing means by common accessing circuitry in said instruction handling apparatus and said storage apparatus whereby the accessing for instruction fetching in a first instruction and the accessing for operand fetching in a second instruction occur at different times because the time-offset of instructions within the instruction sequence processing means equals two clock cycles.

14. The data processing system of claim 8 wherein said instruction sequence processing means includes, an instruction word register for receiving instructions, an instruction buffer register for latching instructions received from said instruction word register, selection means responsive to said sequential control means for selecting the instruction next to be introduced into said instruction pipeline from said instruction buffer register or from said instruction word register.

15. The data processing system of claim 8 wherein said instruction sequence processing means includes a plurality of general purpose registers, input registers for storing information to be stored in said general purpose registers, and output registers for storing information readout from said general purpose registers, wherein said general purpose registers are connected to be accessed under control of a first one of said stages for latching address information in one of said plurality of address registers.

16. In a data processing system having storage apparatus, instruction handling apparatus and instruction execution apparatus wherein said instruction handling apparatus includes instruction sequence processing means having at least three serial stages each for controlling different parts of said system and wherein said apparatus is operative under control of clock cycles and operative to execute instructions where each instruction is executed in segments where each segment has a duration equal to a number of clock cycles and where predetermined stages are active for predetermined segments of each instruction, the improved method comprising, introducing at least three of said instructions serially into said stages with a time-offset between instructions equal to an integral number, greater than unity, of clock cycles, stepping said segmented instructions through said processing means with said time-offset equal to said number of clock cycles.

17. A data processing system having storage apparatus, instruction handling apparatus, and instruction execution apparatus for performing data manipulations under the timing control of clock cycles and operative to execute instructions where each instruction is executed in segments where each segment has a duration equal to at least one clock cycle, the improvement comprising, high-speed buffer means within said storage apparatus operative to be accessed for storing and fetching data within two clock cycles, a plurality of functional units within said execution apparatus wherein at least two of said functional units are serially connected whereby said execution apparatus carries out data manipulations within two clock cycles, instruction sequence processing means within said instruction handling apparatus including a plurality of serial stages, said stages including one stage operative over two consecutive segments of each instruction to control said buffer means and said stages including another stage operative over two different consecutive segments of each instruction to control said two of said functional units, including means for introducing a plurality of segmented instructions into said stages with a time-offset between instructions at least equal to two clock cycles.

18. A data processing system having clock apparatus for producing clock signals having clock cycles, a main store, a storage control unit operative to address and access data in two clock cycles, a channel unit, an instruction unit, an execution unit operative to perform arithmetic and logical functions in two clock cycles, and a console wherein the system performs data manipulations specified by a stored program comprised of a sequence of instructions, wherein each instruction is executed in segments where each segment has a duration equal to one clock cycle, the improvement comprising, instruction sequence processing means including a plurality of address registers for storing address values to be added in forming effective addresses, an effective address adder connected to receive the information stored in said address registers, an effective address register for storing the output from said effective address adder, an instruction pipeline including a plurality of shift-register stages for storing instructions fetched from said storage control unit and including control means each for controlling different parts of said system during different segments of each instruction, sequential control means for causing the effective address in the effective address register to access instructions from said storage apparatus for transfer into said instruction pipeline with a time-offset between consecutive instructions equal to two clock cycles.

19. A data processing system having storage apparatus, instruction handling apparatus and instruction execution apparatus wherein the system performs data manipulations under the control of instructions where instructions are processed at a maximum rate in segments where each segment has a duration equal to one clock cycle, the improvement comprising, clock means providing clock signals which define clock cycles for controlling the data processing system, instruction sequence processing means including a plurality of stages where said plurality of stages include at least five registers for storing instructions and where said stages include control means responsive to information in said registers for controlling said storage apparatus and said instruction execution apparatus, means for sequentially stepping a plurality of said instructions through said stages with a time-offset between consecutive instructions in said registers equal to two clock cycles.

* * * * *